US012639596B2

(12) United States Patent
Palczewski et al.

(10) Patent No.: US 12,639,596 B2
(45) Date of Patent: May 26, 2026

(54) MULTI-INSTANCE LEARNING FRAMEWORK FOR ARTIFICIAL INTELLIGENCE (AI) HOUSEHOLD INFERENCE MODELS

(71) Applicant: Samsung Electronics Co., Ltd., Suwon-si (KR)

(72) Inventors: Tomasz Palczewski, Danville, CA (US); Lenin Mookiah, Houston, TX (US); Yingnan Zhu, Irvine, CA (US); Hari Nayar, Hayward, CA (US); Praveen Pratury, Mountain House, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1155 days.

(21) Appl. No.: 17/356,145

(22) Filed: Jun. 23, 2021

(65) Prior Publication Data

US 2022/0414494 A1 Dec. 29, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .......... G06N 5/04; G06N 20/00; G06N 3/084; G06N 3/09; G06N 3/045
See application file for complete search history.

(56) References Cited

U.S. PATENT DOCUMENTS

| | | | |
|---|---|---|---|
| 9,317,781 B2 | 4/2016 | Tu et al. | |
| 9,495,361 B2 | 11/2016 | Allen et al. | |
| 9,886,094 B2 | 2/2018 | Wang et al. | |
| 10,719,780 B2 | 7/2020 | Lee et al. | |
| 10,785,533 B2 | 9/2020 | Pecjak et al. | |
| 2015/0356455 A1 | 12/2015 | Wu et al. | |
| 2017/0063893 A1* | 3/2017 | Franc | G06F 21/53 |

(Continued)

OTHER PUBLICATIONS

M. Fang, J. Yin and X. Zhu, "Transfer Learning across Networks for Collective Classification," 2013 IEEE 13th International Conference on Data Mining, Dallas, TX, USA, 2013, pp. 161-170, doi: 10.1109/ICDM.2013.116. keywords: Subspace constraints;Knowledge engineering;Prediction algorithms;Convergence (Year: 2013).*

(Continued)

*Primary Examiner* — Van C Mang

(57) ABSTRACT

A method includes obtaining, using at least one processor of an electronic device, one or more instance level supervised artificial intelligence (AI) models. The method also includes obtaining, using the at least one processor, aggregated level label information related to the one or more instance level supervised AI models. The method further includes obtaining, using the at least one processor, instance level feature information related to the one or more instance level supervised AI models. In addition, the method includes training, using the at least one processor, the one or more instance level supervised AI models using the instance level feature information and the aggregated level label information to obtain one or more trained instance level supervised AI models.

20 Claims, 5 Drawing Sheets

(56)        References Cited

U.S. PATENT DOCUMENTS

2022/0237788 A1*    7/2022   Shaul ..................... G16H 50/70

OTHER PUBLICATIONS

Kotzias, Dimitrios, et al. "From group to individual labels using deep features." Proceedings of the 21th ACM SIGKDD international conference on knowledge discovery and data mining. 2015. (Year: 2015).*

Zhao, Yu, et al. "Predicting lymph node metastasis using histopathological images based on multiple instance learning with deep graph convolution." Proceedings of the IEEE/CVF conference on computer vision and pattern recognition. 2020. (Year: 2020).*

Carbonneau et al., "Multiple Instance Learning: A Survey of Problem Characteristics and Applications", https://arxiv.org/pdf/1612.03365.pdf, 2016, 37 pgs.

* cited by examiner

┌500

START

502 ~  OBTAIN INSTANCE LEVEL SUPERVISED MODEL(S)

504 ~  OBTAIN AGGREGATED LEVEL LABEL INFORMATION RELATED TO MODEL(S)

506 ~  OBTAIN INSTANCE LEVEL FEATURE INFORMATION RELATED TO MODEL(S)

508 ~  TRAIN THE INSTANCE LEVEL SUPERVISED MODEL(S) USING THE AGGREGATED LEVEL LABEL INFORMATION AND THE INSTANCE LEVEL FEATURE INFORMATION

END

MULTI-INSTANCE LEARNING FRAMEWORK FOR ARTIFICIAL INTELLIGENCE (AI) HOUSEHOLD INFERENCE MODELS

TECHNICAL FIELD

This disclosure relates generally to artificial intelligence (AI) systems. More specifically, this disclosure relates to a multi-instance learning framework for AI household inference models.

BACKGROUND

The availability and use of information about users or customers are important for success in many businesses. For example, information regarding household demographics is useful in many fields. As particular examples, marketing and ad placement are frequently based on age and gender information. Therefore, it is helpful to precisely determine attributes of people who reside in a household. Some household demographic information can be inferred from data collected by connected televisions (also referred to as smart TVs). However, collection of precise demographic information from individual televisions can be very difficult for many reasons, including privacy concerns, difficulties of instance level data collection, and cost constraints.

SUMMARY

This disclosure provides a multi-instance learning framework for artificial intelligence (AI) household inference models.

In a first embodiment, a method includes obtaining, using at least one processor of an electronic device, one or more instance level supervised AI models. The method also includes obtaining, using the at least one processor, aggregated level label information related to the one or more instance level supervised AI models. The method further includes obtaining, using the at least one processor, instance level feature information related to the one or more instance level supervised AI models. In addition, the method includes training, using the at least one processor, the one or more instance level supervised AI models using the instance level feature information and the aggregated level label information to obtain one or more trained instance level supervised AI models.

In a second embodiment, an electronic device includes at least one memory configured to store instructions. The electronic device also includes at least one processing device configured when executing the instructions to obtain one or more instance level supervised AI models. The at least one processing device is also configured when executing the instructions to obtain aggregated level label information related to the one or more instance level supervised AI models. The at least one processing device is further configured when executing the instructions to obtain instance level feature information related to the one or more instance level supervised AI models. In addition, the at least one processing device is configured when executing the instructions to train the one or more instance level supervised AI models using the instance level feature information and the aggregated level label information to obtain one or more trained instance level supervised AI models.

In a third embodiment, a non-transitory machine-readable medium contains instructions that when executed cause at least one processor of an electronic device to obtain one or more instance level supervised AI models. The medium also contains instructions that when executed cause the at least one processor to obtain aggregated level label information related to the one or more instance level supervised AI models. The medium further contains instructions that when executed cause the at least one processor to obtain instance level feature information related to the one or more instance level supervised AI models. In addition, the medium contains instructions that when executed cause the at least one processor to train the one or more instance level supervised AI models using the instance level feature information and the aggregated level label information to obtain one or more trained instance level supervised AI models.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another.

For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOME-POD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
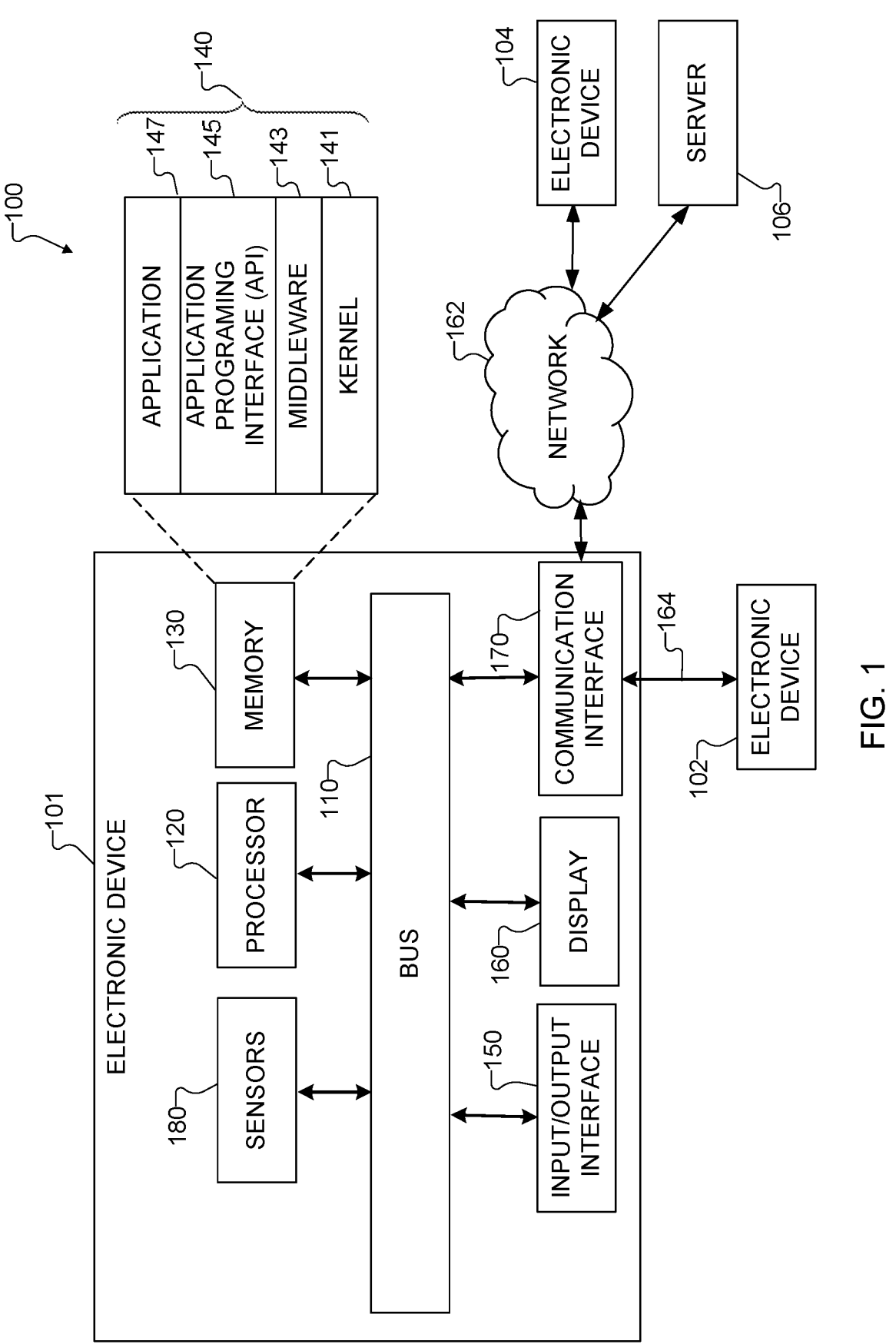
FIG. 1 illustrates an example network configuration including an electronic device according to this disclosure.

FIGS. 1 through 5, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, the availability and use of information about users or customers are important for success in many businesses. For example, information regarding household demographics is useful in many fields. As particular examples, marketing and ad placement are frequently based on age and gender information. Therefore, it is helpful to precisely determine attributes of people who reside in a household. Some household demographic information can be inferred from data collected by connected televisions (also referred to as smart TVs). However, collection of precise demographic information from individual televisions can be very difficult for many reasons, including privacy concerns, difficulties of instance level data collection, and cost constraints.

There has been extensive research on artificial intelligence (AI)-based models to fulfill accuracy requirements needed to deliver models that can minimize the cost of marketing and ads by precise age and gender targeting. However, supervised AI models are often based on third party data since many manufacturers do not collect age and gender information of users during initial device configuration. This results in less precise models. For example, in the case of smart TVs, household demographic prediction optimization based on one or more users' television watching behaviors collected from smart TVs often lacks accurate labels to train supervised deep-learning models. Therefore, many smart TV manufacturers use third party data to acquire label information. In general, a system that uses supervised learning can take instance level features and instance level labels and input the features and labels into a supervised AI model training routine in order to train an AI model. Unfortunately, external providers of third party data may be unable to deliver precise instance level information. Thus, current supervised models may not deliver results as precisely as they could with better understanding of a reasonable-sized pool of users and knowledge of their demographics. In such cases, unsupervised training can be performed. However, such training typically results in less accurate models that are more difficult to implement and maintain.

This disclosure provides systems and methods for multi-instance training for AI household inference models. The disclosed embodiments allow training of developed AI models based on data collected at the aggregated level (such as data collected only for groups of households, not for individual households, which represent the instance level). Some of the disclosed embodiments allow supervised AI models to be trained or tuned using feedback information, such as from NIELSEN Digital Ads Ratings (DAR) measurement data or other data. Some embodiments support transfer learning, which allows for modifications of a loss function and the addition of constraints that promote better precision of instance level models.

The disclosed embodiments help to ensure high precision demographic household predictions. Such improvements increase the understanding of user demographics based on content watching history and, as a final result, deliver more precise demographic predictions. Note that while some of the embodiments discussed below are described in the context of television and demographic information, this is merely one example, and it will be understood that the principles of this disclosure may be implemented in any number of other suitable contexts.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations to support a multi-instance learning framework for AI household inference models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for multi-instance learning for AI household inference models as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support a multi-instance learning framework for AI household inference models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
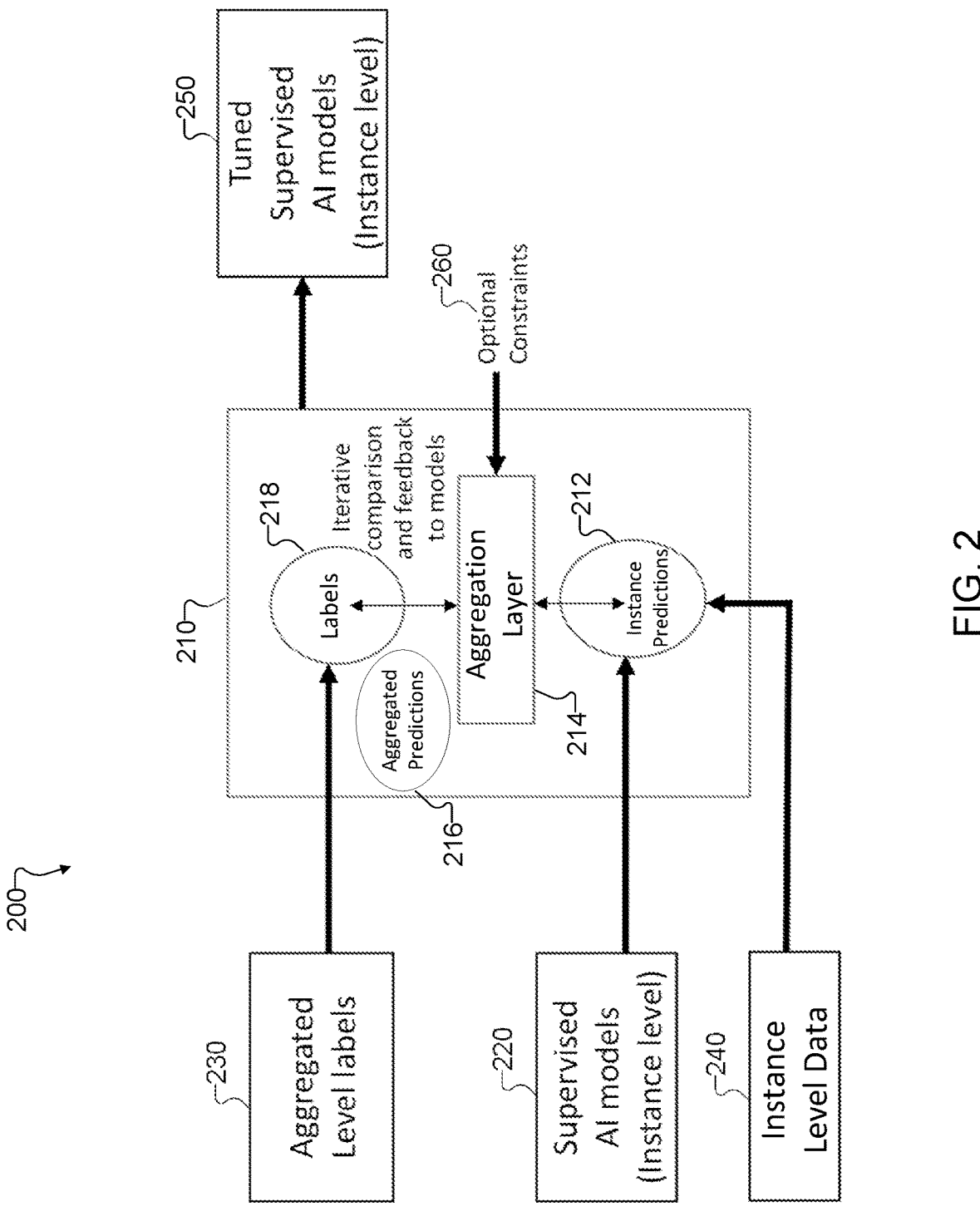
FIG. 2 illustrates an example framework for multi-instance learning for artificial intelligence (AI) household inference models according to this disclosure.

FIG. 2 illustrates an example framework 200 for multi-instance learning for AI household inference models according to this disclosure. Note that the framework 200 is described in the context of user demographic information associated with television viewing and may be implemented using one or more components of the electronic device 101 described above. However, this is merely one example, and the framework 200 could include any suitable context(s) or device(s), such as when implemented using the server 106. The framework 200 may also be used in any other suitable context.

As discussed below, the framework 200 uses modified principles of multi-instance learning to enable retraining of AI models (such as deep learning models, machine learning models, and the like) based on aggregated feedback information. The framework 200 allows changes to a loss function in order to obtain better results on the aggregated level. In some cases, the loss function can be a combination of instance level and aggregated level components. Also, in some embodiments, the framework 200 allows a combination of multiple developed models into a single model that is cost effective and easy to maintain. In addition, the framework 200 supports an additional abstraction layer to perform transfer learning based on aggregated level labels. Using the framework 200, retrained models can more precisely and accurately identify, for example, in which households there are both females and males in the 25-34 age bracket. The retrained models may also more precisely and accurately identify how the demographics for the households change, such as for different times of day and for specific content genres. For instance, the retrained models may predict that, for a specific household, a female watches mainly morning shows and a male watches mainly evening shows. Such instance level predictions can be very valuable, such as for advertising, marketing, and the like.

As shown in FIG. 2, the framework 200 includes a training module 210 that receives multiple inputs. In this example, the multiple inputs can include one or more instance level supervised AI models 220, aggregated level labels 230, and instance level data 240. The framework 200 generates one or more outputs, such as one or more trained or tuned instance level supervised AI models 250.

The instance level supervised AI models 220 can represent deep learning models that are to be trained by the training module 210. In the framework 200, the instance level supervised AI models 220 represent models for which instance level information is used for training. However, the instance level labels may not be precise enough, or the dataset with precise instance level information may be too small. Depending on the embodiment, the instance level supervised AI models 220 can include various combinations of layers, including dense layers, dropout layers, embedding layers, flatten layers, batch normalization layers, concatenation layers, rectified linear unit (ReLU) activation functions, sigmoid or softmax activation functions, and the like.

In some embodiments, the instance level supervised AI models 220 include AI household inference models that are used for determining, estimating, or predicting household demographic information. Some particular examples of instance level supervised AI models 220 include top models, down models, and viewership assignment models. Top models are general, broad models that are used to determine key characteristics of users, such as television viewers. Down models are used to infer information about specific age and gender brackets (such as how many females aged 18-25 are in a specific household). Viewership assignment models are used to account for the fact that content (such as television content) can be viewed by multiple individuals from multiple demographics at the same time and can change demographics depending on the genre of the content and the time of day that the content was viewed. In general, the instance level supervised AI models 220 can include any suitable instance level AI model that can be trained using the framework 200.

Figure 3:
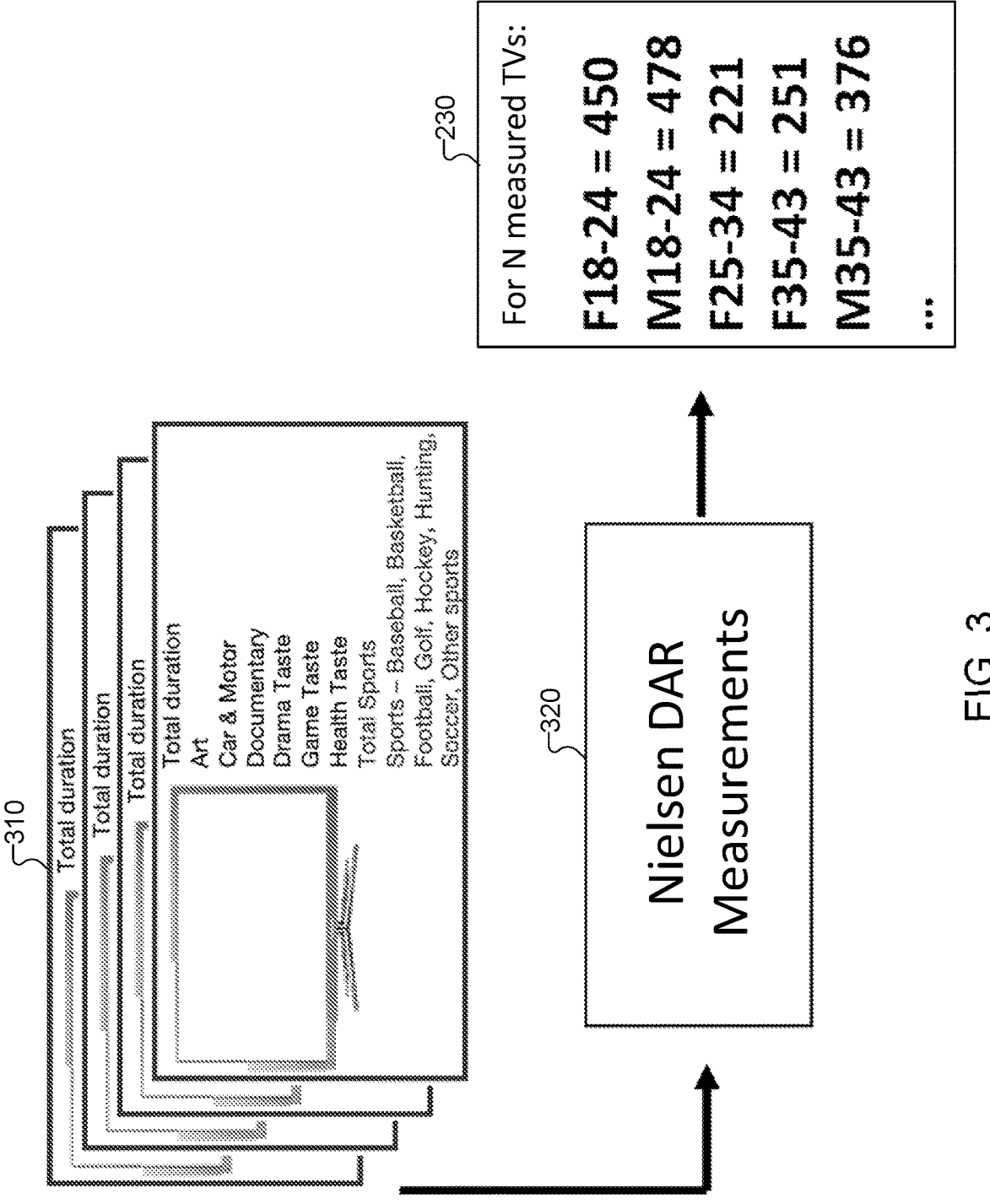
FIG. 3 illustrates example aggregated level labels used in the framework of FIG. 2 according to this disclosure.

The aggregated level labels 230 are labels representing aggregated information and are used in the framework 200 to improve the accuracy of the instance level supervised AI models 220 when the instance level labels are limited in quantity or accuracy, or simply unavailable. FIG. 3 illustrates example aggregated level labels 230 used in the framework 200 of FIG. 2 according to this disclosure. As shown in FIG. 3, the aggregated level labels 230 are generated using NIELSEN DAR data, which provides a comprehensive view of audience and viewer information. The NIELSEN COMPANY collects raw information 310 regarding viewership of content from millions of televisions over time. The raw information 310 is compiled into NIELSEN DAR measurements 320, which include aggregated level demographics for groups of devices that were exposed in advertisement campaigns. Such data can be further compiled or filtered into the aggregated level labels 230.

One characteristic of NIELSEN DAR measurements 320 is the multi-instance nature of the data, such as only aggregated information of age and gender for multiple households. Likewise, in the example of FIG. 3, the aggregated level labels 230 indicate numbers of individuals in each demographic group. For example, the group represented in the aggregated level labels 230 includes 450 females aged 18-24 and 478 males ages 18-24. Of course, these numbers and groupings are merely examples, and other aggregated level labels 230 could include other aggregated level information grouped in other ways. In addition, the aggregated level labels 230 could be generated or provided from other sources besides NIELSEN DAR measurements 320. For example, in some embodiments, the aggregated level labels 230 could be obtained from another third party data provider or generated in-house.

The instance level data 240 includes instance level feature representations of training data. For example, the instance level data 240 may include information collected from each of multiple televisions and may specifically include information regarding time periods when the television was on, content that was displayed on the television, interactions that occurred with viewers, and the like. In some embodiments, the instance level feature representations of the training data may be available, but the associated instance level labels may not be. Also, in some embodiments, the instance level feature representations of the training data may be limited in quantity or accuracy. In other embodiments, the instance level feature representations of the training data may be simply unavailable for use in training. The framework 200 uses the aggregated level labels 230 to address these situations.

The training module 210 obtains the instance level supervised AI models 220, the aggregated level labels 230, and the instance level data 240 as inputs and uses the aggregated level labels 230 and the instance level data 240 to train the instance level supervised AI models 220. In some embodiments, the training module 210 can combine the different instance level supervised AI models 220 for training at the same time. The training module 210 uses the instance level supervised AI models 220 and the instance level data 240 to make predictions 212 at the instance level. An aggregation layer 214 in the training module 210 takes the instance level predictions 212 and groups the predictions 212 into bags of information, which are aggregated into histogram information. The histogram information is used as aggregated level predictions 216, and the aggregated level predictions 216 are based on modified principles of multi-instance learning (MIL). Some conventional MTh approaches represent a dataset as a set of bags $X=\{X_1, X_2, \ldots, X_N\}$, where each of the bags can be represented as $X_i=\{x_{i1}, x_{i2}, \ldots, x_{im}\}$ and where $x_{ij}$ denotes the $j^{th}$ instance in the bag i and $m_i$ denotes the total number of instances in the bag i. In the framework 200, this approach is modified by using specific information about each bag as one or more aggregated level predictions 216. That is, instead of a single bag label, each bag receives a histogram of aggregated level information as an aggregated level prediction 216. From the aggregated level labels 230, the training module 210 extract labels 218 that correspond to each of the aggregated level predictions 216.

Figure 4:
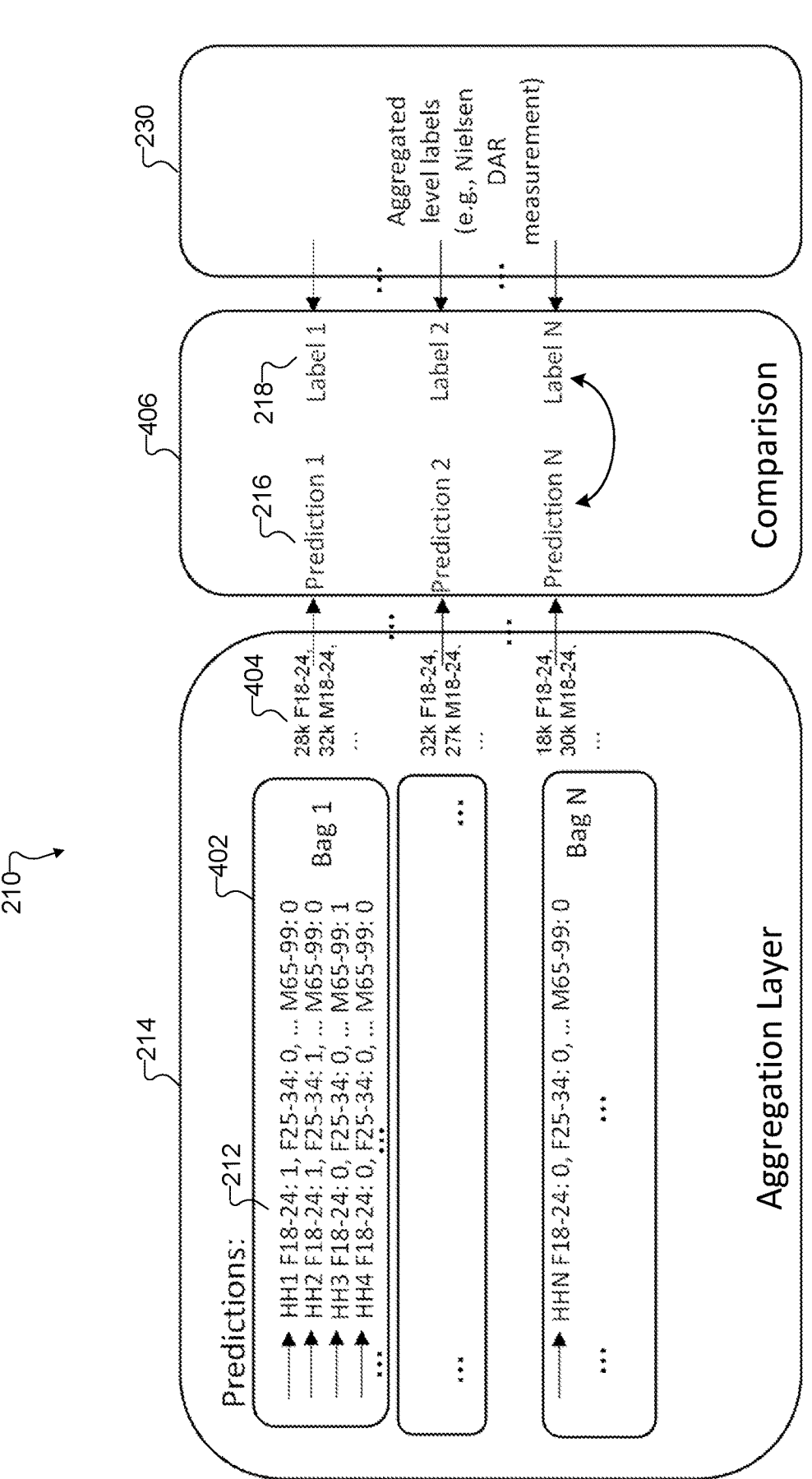
FIG. 4 illustrates an example training module used in the framework of FIG. 2 according to this disclosure.

FIG. 4 illustrates an example training module 210 used in the framework 200 of FIG. 2 according to this disclosure. As shown in FIG. 4, multiple instance level predictions 212 are generated by the training module 210 using the instance level supervised AI models 220 and the instance level data 240. In this example, each instance level prediction 212 is associated with a particular household. For example, in household 1 (HH1), the instance level prediction 212 predicts one female aged 18-24. In household 3 (HH3), the instance level prediction 212 predicts one male aged 65-99. The aggregation layer 214 takes the instance level predictions 212 for all households and groups the predictions 212 into bags 402 of information. In this example, the bags 402 are numbered 1-N. Depending on the quantity of available data, each bag 402 can have dozens, hundreds, or thousands (or more) of predictions 212. In general, the bags 402 are organized to correspond to the organization and level of granularity found in the aggregated level labels 230. The aggregation layer 214 aggregates the predictions 212 in each bag 402 into histogram information 404, which is used as the aggregated level predictions 216. For example, in FIG. 4, the aggregated level prediction 216 for bag 1 (identified as Prediction 1) includes approximately 28,000 females aged 18-24 and 32,000 males aged 18-24.

The training module 210 uses an iterative process to make predictions, compare predictions to labels, and back propagate through the models based on the comparison in order to adjust the weights of the models (with the goal of improving the predictions to be closer to the labels). Specifically, in each iteration, the training module 210 generates the aggregated level predictions 216 from the instance level predictions 212 generated by the instance level supervised AI models 220, performs a comparison operation 406 to compare the aggregated level predictions 216 with the labels 218 from the aggregated level labels 230, and adjusts one or more weights based on the comparison. After a number of iterations, the training module 210 may not observe any improvement or any significant amount of improvement with the aggregated level predictions 216. This may indicate that the training module 210 has determined the best set of weights in order to get the best predictions.

The comparison of the aggregated level predictions 216 with the labels 218 involves a loss function, and the training module 210 improves the aggregated level predictions 216 by minimizing the loss function during training. In the framework 200, the loss function includes both instance level components and aggregated level components. In some embodiments, the instance level components are based on a weighted binary cross entropy (BCE) loss function. In particular embodiments, the instance level portion of the loss function can be represented as:

$$H_p(q) = -\frac{1}{N}\sum_{i=1}^{N}\frac{1}{14}\sum_{k=1}^{14} w_{0,k} * y_{i,k} * \log(p(y_{i,k})) + \tag{1}$$
$$w_{1,k} * (1 - y_{i,k}) * \log(1 - p(y_{i,k}))$$

Here, $H_p$ (q) represents the instance level portion of the loss function, $w_0$ and $w_1$ respectively represent negative and positive class weights, N represents the total number of examples, k represents the class number, $y_{i,k}$ represents the $i^{th}$ label for class k, and $p(y_{i,k})$ represents the predicted probability for the label $y_{i,k}$. This specific example of Equation (1) is based on the framework 200 classifying fourteen (14) age and gender buckets (referred to here as classes), so the range of k is from 1 to 14. Of course, this is merely one example, and other embodiments could include other numbers of classes.

The aggregated level components of the loss function can be described as follows. If the labels for M examples for which there are aggregated measurements are summed together, the result is two histograms that can be compared. For each class, the comparison can be considered as a regression problem. In other words, each instance level supervised AI model 220 performs classification but, as a result, each model 220 also predicts a number of examples in each class of age and gender for collection of examples. Thus, in some embodiments, the aggregated level components are based on a mean squared error (MSE) loss. In particular embodiments, the aggregated level components can be represented as:

$$H_{MIL} = \frac{1}{14}\sum_{k=1}^{14} w_{2,k} * \frac{\left(DAR(k) - \sum_{j=1}^{M} p(y_j, k)\right)^2}{M} \tag{2}$$

Here, $H_{MIL}$ represents the aggregated level portion of the loss function, DAR(k) represents the aggregated level label for the class k and represents the label 218, M represents the quantity of all examples measured in one epoch of the NIELSEN DAR, and $w_2$ represents an importance weight for the aggregated information for each class. In this example, N is a batch subsample of M.

In each iteration, the instance level predictions 212 and the histogram information 404, which is used as the aggregated level predictions 216, are adjusted. The goal of the training is to minimize the overall loss function, which is the sum of the instance level portion of the loss function $H_p$ (q) and the aggregated level portion of the loss function $H_{MIL}$. The instance level predictions 212 and the histogram information 404 can be adjusted by adjusting one or more of the weights in Equations (1) and (2), such as $w_{0,k}$, $w_{1,k}$, or $w_{2,k}$.

Once trained, the tuned supervised AI models 250 are able to generate more accurate instance level predictions. For example, the tuned supervised AI models 250 may be able to predict that TV 1 or Household 1 is associated with one female aged 18-24 and one male aged 18-24 and that TV 2 or Household 2 is associated with one female aged 25-34, one female aged 35-43, and one male aged 35-43.

In some embodiments, the framework 200 supports an option to impose one or more constraints on the aggregated histogram information 404 generated from each bag 402. One example constraint could be that a bag 402 should not have more than 28,000 females aged 18-24.

As discussed above, the framework 200 trains deep-learning models using both instance level information and aggregated level information. The loss function includes parameters for both instance level information and aggregated level information. However, in some embodiments, the instance level data 240 may not be available or accurate. In such embodiments, the framework 200 can train the instance level supervised AI models 220 using only information at the aggregated level. That is, training can occur with no instance level data 240 input to the training module 210. Here, the loss function is based only on the aggregated level portion $H_{MIL}$. In addition, in some embodiments, the framework 200 trains machine learning models instead of deep learning models. When training machine learning models, the framework 200 can use both instance level information and aggregated level information for optimization or use just aggregated level information.

In some embodiments, the framework 200 can be used to perform transfer learning using the aggregated level labels 230. Transfer learning involves reusing a model that was constructed based on a different dataset that is similar to a dataset of interest. For example, instead of the models 220 predicting information about user demographics (such as age, gender, and the like), the framework 200 can train the models 220 using the aggregated level labels 230 to predict other information regarding classes or groups of users (such as user purchasing habits).

As described here, the framework 200 can be used for training instance level supervised AI models 220 that predict demographic information associated with television viewing. However, this is merely one example, and the framework 200 can be used in other situations where there is not precise information for a single instance but more precise information exists at an aggregated level with multiple instances. Such situations may arise in areas where privacy concerns are present, such as median income for a group of customers, average level of education, overall user preferences, and the like. As a particular example, the framework 200 can be used to train one or more models that predict salary range information (such as $20,000-$40,000, $40,000-$80,000, etc.) for individual televisions or households in a particular geographic location (such as the New York City metropolitan area). As another example, the framework 200 can be used to train one or more models that predict house price ranges using aggregated income information.

The operations and functions shown in FIGS. 2 through 4 can be implemented in an electronic device 101, server 106, or other device in any suitable manner. For example, in some embodiments, the operations shown in FIGS. 2 through 4 can be implemented or supported using one or more software applications or other software instructions that are executed by the processor 120 of the electronic device 101, server 106, or other device. In other embodiments, at least some of the operations shown in FIGS. 2 through 4 can be implemented or supported using dedicated hardware components. In general, the operations shown in FIGS. 2 through 4 can be performed using any suitable hardware or any suitable combination of hardware and software/firmware instructions.

Although FIGS. 2 through 4 illustrate one example of a framework 200 for multi-instance learning for AI household inference models and related details, various changes may be made to FIGS. 2 through 4. For example, while the framework 200 is described with three supervised AI models 220, other embodiments could include other numbers of AI models to train. Also, while shown as a specific sequence of operations, various operations shown in FIGS. 2 through 4 could overlap, occur in parallel, occur in a different order, or occur any number of times (including zero times). In addition, the specific operations shown in FIGS. 2 through 4 are examples only, and other techniques could be used to perform each of the operations shown in FIGS. 2 through 4.

Figure 5:
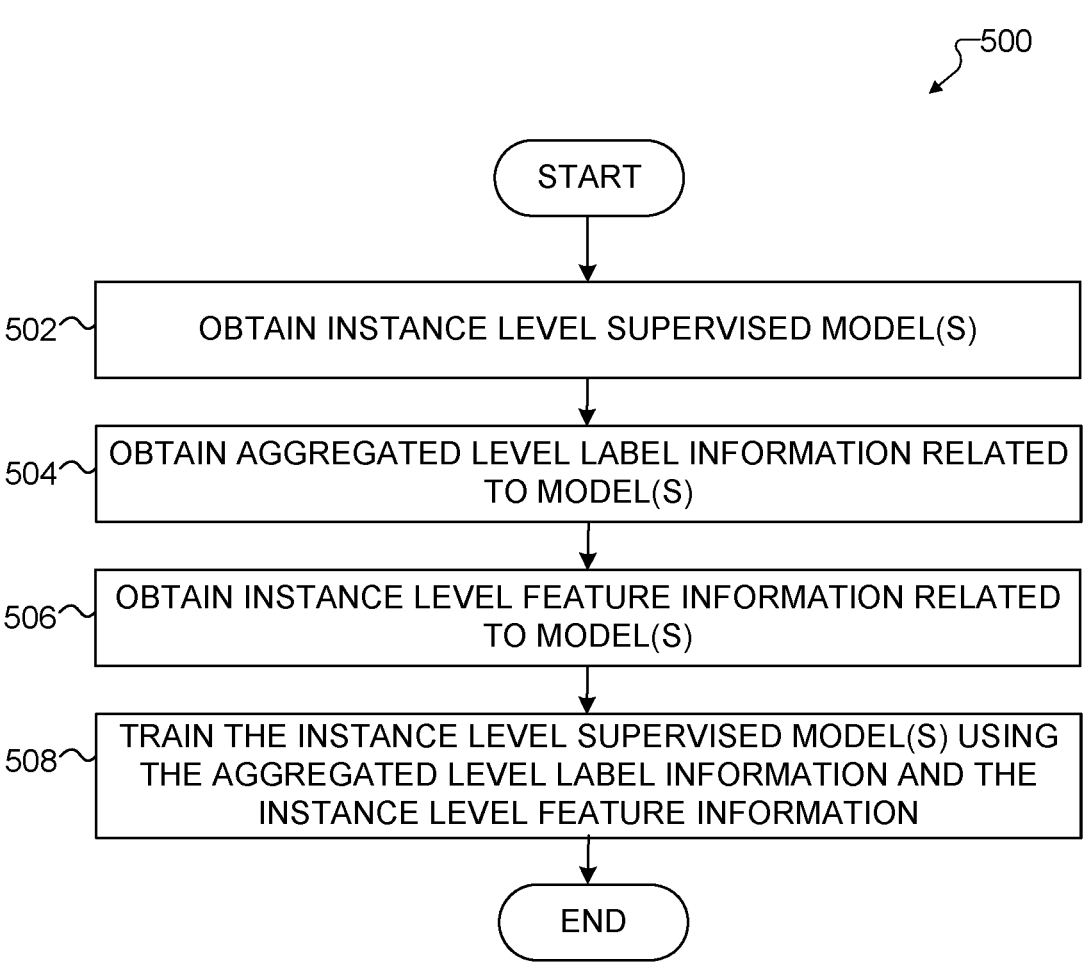
FIG. 5 illustrates an example method for training instance level supervised AI models according to this disclosure.

FIG. 5 illustrates an example method 500 for training instance level supervised AI models according to this disclosure. For ease of explanation, the method 500 shown in FIG. 5 is described as involving the use of the framework 200 shown in FIGS. 2 through 4 and the electronic device 101 shown in FIG. 1. However, the method 500 shown in FIG. 5 could be used with any other suitable electronic device (such as the server 106) and in any suitable system.

As shown in FIG. 5, one or more instance level supervised AI models are obtained at an electronic device at step 502. This could include, for example, the electronic device 101 obtaining one or more instance level supervised AI models 220. Aggregated level label information related to the one or more instance level supervised AI models is obtained at the electronic device at step 504. This could include, for example, the electronic device 101 obtaining the aggregated level labels 230, such as from a third party data provider. Instance level feature information related to the one or more instance level supervised AI models is obtained at the electronic device at step 506. This could include, for example, the electronic device 101 obtaining the instance level data 240.

The instance level supervised AI models are trained using the instance level feature information and the aggregated level label information to obtain one or more trained instance level supervised AI models at step 508. This could include, for example, the electronic device 101 training the instance level supervised AI models 220. In some embodiments, the training includes generating aggregated level predictions from instance level predictions generated by the one or more instance level supervised AI models, iteratively comparing the aggregated level predictions with labels from the aggregated level label information, and adjusting weights based on the comparison to minimize a loss function.

Although FIG. 5 illustrates one example of a method 500 for training instance level supervised AI models, various changes may be made to FIG. 5. For example, while shown as a series of steps, various steps in FIG. 5 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining, using at least one processor of an electronic device, one or more instance level supervised artificial intelligence (AI) models;

obtaining, using the at least one processor, aggregated level label information related to the one or more instance level supervised AI models;

obtaining, using the at least one processor, instance level feature information related to the one or more instance level supervised AI models; and training, using the at least one processor, the one or more instance level supervised AI models using the instance level feature information and the aggregated level label information to obtain one or more trained instance level supervised AI models;

wherein the training includes performing transfer learning using the aggregated level label information; and wherein training the one or more instance level supervised AI models comprises:

generating, by the one or more instance level supervised AI models, instance level predictions using the instance level feature information;

grouping, by an aggregation layer of the one or more instance level supervised AI models, the instance level predictions into bags;

providing, to each bag, a histogram of aggregated level information as an aggregated level prediction;

aggregating, by the aggregation layer, the instance level predictions from the bags into aggregated level predictions comprising histogram information;

adding one or more constraints on the aggregated level predictions comprising the histogram information;

extracting the aggregated level label information corresponding to the aggregated level predictions from the bags; and using the aggregated level predictions and the aggregated level label information to modify the one or more instance level supervised AI models.

2. The method of claim 1, wherein training the one or more instance level supervised AI models further comprises:

iteratively comparing the aggregated level predictions with labels from the aggregated level label information; and adjusting weights of the one or more instance level supervised AI models based on the comparison.

3. The method of claim 2, wherein, in each of a plurality of training iterations, the histogram information and the aggregated level predictions are adjusted by altering one or more weights in a loss function pertaining to the histogram information and the aggregated level predictions.

4. The method of claim 2, wherein training the one or more instance level supervised AI models further comprises minimizing a loss function that includes one or more aggregated level parameters.

5. The method of claim 4, wherein:

the loss function further includes instance level parameters; and minimizing the loss function comprises minimizing a sum of the aggregated level parameters and the instance level parameters.

6. The method of claim 1, wherein the transfer learning provides for modifications of a loss function and the adding of the one or more constraints to improve precision of the one or more instance level supervised AI models.

7. The method of claim 1, wherein the aggregated level label information includes labels associated with aggregated groups of data and does not include labels associated with single instance level data.

8. The method of claim 1, wherein the one or more constraints impose one or more restrictions on at least one of the bags.

9. The method of claim 1, wherein the one or more instance level supervised AI models are associated with household demographic information.

10. An electronic device comprising:

at least one memory configured to store instructions; and at least one processing devices configured when executing the instructions to:

obtain one or more instance level supervised artificial intelligence (AI) models;

obtain aggregated level label information related to the one or more instance level supervised AI models;

obtain instance level feature information related to the one or more instance level supervised AI models; and train the one or more instance level supervised AI models using the instance level feature information and the aggregated level label information to obtain one or more trained instance level supervised AI models;

wherein, to train the one or more instance level supervised AI models, the at least one processing device is configured to perform transfer learning using the aggregated level label information; and wherein, to train the one or more instance level supervised AI models, the at least one processing device is configured to:

generate, by the one or more instance level supervised AI models, instance level predictions using the instance level feature information;

group, by an aggregation layer of the one or more instance level supervised AI models, the instance level predictions into bags;

provide, to each bag, a histogram of aggregated level information as an aggregated level prediction;

aggregate, by the aggregation layer, the instance level predictions from the bags into aggregated level predictions comprising histogram information;

add one or more constraints on the aggregated level predictions comprising the histogram information;

extract the aggregated level label information corresponding to the aggregated level predictions from the bags; and use the aggregated level predictions and the aggregated level label information to modify the one or more instance level supervised AI models.

11. The electronic device of claim 10, wherein, to train the one or more instance level supervised AI models, the at least one processing device is further configured to:

iteratively compare the aggregated level predictions with labels from the aggregated level label information; and adjust weights of the one or more instance level supervised AI models based on the comparison.

12. The electronic device of claim 11, wherein the at least one processing devices is configured when executing the instructions, in each of a plurality of training iterations, to adjust the histogram information and the aggregated level predictions by altering one or more weights in a loss function pertaining to the histogram information and the aggregated level predictions.

13. The electronic device of claim 11, wherein, to train the one or more instance level supervised AI models, the at least one processing device is configured to minimize a loss function that includes one or more aggregated level parameters.

14. The electronic device of claim 13, wherein:

the loss function further includes instance level parameters; and to minimize the loss function, the at least one processing device is configured to minimize a sum of the aggregated level parameters and the instance level parameters.

15. The electronic device of claim 10, wherein the transfer learning provides for modifications of a loss function and the addition of the one or more constraints to improve precision of the one or more instance level supervised AI models.

16. The electronic device of claim 10, wherein the aggregated level label information includes labels associated with aggregated groups of data and does not include labels associated with single instance level data.

17. The electronic device of claim 10, wherein: the one or more constraints impose one or more restrictions on at least one of the bags.

18. A non-transitory machine-readable medium containing instructions that when executed cause at least one processor of an electronic device to:

obtain one or more instance level supervised artificial intelligence (AI) models;

obtain aggregated level label information related to the one or more instance level supervised AI models;

obtain instance level feature information related to the one or more instance level supervised AI models; and train the one or more instance level supervised AI models using the instance level feature information and the aggregated level label information to obtain one or more trained instance level supervised AI models;

wherein the instructions that when executed cause the at least one processor to train the one or more instance level supervised AI models comprise instructions that when executed cause the at least one processor to perform transfer learning using the aggregated level label information; and wherein the instructions that when executed cause the at least one processor to train the one or more instance level supervised AI models comprise instructions that when executed cause the at least one processor to:

generate, by the one or more instance level supervised AI models, instance level predictions using the instance level feature information;

group, by an aggregation layer of the one or more instance level supervised AI models, the instance level predictions into bags;

provide, to each bag, a histogram of aggregated level information as an aggregated level prediction;

aggregate, by the aggregation layer, the instance level predictions from the bags into aggregated level predictions comprising histogram information;

add one or more constraints on the aggregated level predictions comprising the histogram information;

extract the aggregated level label information corresponding to the aggregated level predictions from the bags; and use the aggregated level predictions and the aggregated level label information to modify the one or more instance level supervised AI models.

19. The non-transitory machine-readable medium of claim 18, wherein the instructions that when executed cause the at least one processor to train the one or more instance level supervised AI models further comprise instructions that when executed cause the at least one processor to:

iteratively compare the aggregated level predictions with labels from the aggregated level label information; and adjust weights of the one or more instance level supervised AI models based on the comparison.

20. The non-transitory machine-readable medium of claim 19, wherein the instructions when executed cause the at least one processor, in each of a plurality of training iterations, to adjust the histogram information and the aggregated level predictions by altering one or more weights in a loss function pertaining to the histogram information and the aggregated level predictions.

* * * * *